US007839866B2

(12) United States Patent
Chen et al.

(10) Patent No.: US 7,839,866 B2
(45) Date of Patent: Nov. 23, 2010

(54) EXTENDED VIRTUAL USER-TO-NETWORK INTERFACE WITH ATM NETWORK

(75) Inventors: Wenge Chen, Pleasanton, CA (US); Peter Chou, San Ramon, CA (US); Kuo-Hui Liu, Pleasanton, CA (US); Michael P. Sinwald, Tracy, CA (US); Shih Chung Soon, Dublin, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 18 days.

(21) Appl. No.: 12/057,581

(22) Filed: Mar. 28, 2008

(65) Prior Publication Data
US 2008/0175250 A1 Jul. 24, 2008

Related U.S. Application Data

(63) Continuation of application No. 10/369,505, filed on Feb. 21, 2003, now Pat. No. 7,382,785.

(51) Int. Cl.
H04L 12/56 (2006.01)
(52) U.S. Cl. ........................................ 370/399; 370/401
(58) Field of Classification Search ............ 370/395.21, 370/395.43, 397, 399, 400, 401, 419, 420; 709/231, 232
See application file for complete search history.

(56) References Cited

U.S. PATENT DOCUMENTS

| 4,494,231 | A | 1/1985 | Slawy et al. |
| 5,051,982 | A | 9/1991 | Brown et al. |
| 5,274,643 | A | 12/1993 | Fisk |
| 5,490,141 | A | 2/1996 | Lai et al. |
| 5,610,969 | A | 3/1997 | McHerry et al. |
| 5,764,645 | A | 6/1998 | Bernet et al. |
| 5,828,838 | A | 10/1998 | Downs et al. |
| 5,842,040 | A | 11/1998 | Hughes et al. |
| 5,892,924 | A | 4/1999 | Lyon et al. |
| 5,905,726 | A | 5/1999 | Gupta |
| 5,920,562 | A | 7/1999 | Christie et al. |
| 5,923,740 | A | 7/1999 | Ito et al. |

(Continued)

FOREIGN PATENT DOCUMENTS

| EP | 0961519 | 12/1999 |
| EP | 1316177 | 6/2003 |
| JP | 8-186580 | 7/1996 |

(Continued)

OTHER PUBLICATIONS

"User Interface Design for Videoconferencing Entries", IBM Technical Disclosure Bulletin, pp. 539-540 (Apr. 1994).

OTHER PUBLICATIONS

"Efficient Routing of Packets for Multi-Media, Peer to Peer Applications", IBM Technical Disclosure Bulletin, pp. 459-460 (May 1994).

(Continued)

*Primary Examiner*—Pankaj Kumar
*Assistant Examiner*—Duc T Duong
(74) *Attorney, Agent, or Firm*—Greenblum & Bernstein P.L.C.

(57) ABSTRACT

Communication between a source and a destination is dynamically established. A connection request is received. The connection request is based on a request transmitted over a best-effort path from the source. A network connection is established having a specified quality of service (QoS) based on the request between the source and the destination. Data for a first application is transmitted over the network connection and data for a second application is transmitted over the best-effort path.

19 Claims, 6 Drawing Sheets

U.S. PATENT DOCUMENTS

| | | | |
|---|---|---|---|
| 5,943,337 A | 8/1999 | Sasagawa | |
| 5,953,338 A * | 9/1999 | Ma et al. | 370/395.21 |
| 5,956,334 A | 9/1999 | Chu et al. | |
| 5,970,064 A | 10/1999 | Clark et al. | |
| 5,974,048 A | 10/1999 | Godse et al. | |
| 5,991,301 A | 11/1999 | Christie | |
| 5,999,514 A | 12/1999 | Kato | |
| 5,999,518 A | 12/1999 | Nattkemper et al. | |
| 5,999,532 A | 12/1999 | Terasaki | |
| 6,028,924 A | 2/2000 | Ram et al. | |
| 6,028,933 A | 2/2000 | Heer et al. | |
| 6,031,840 A | 2/2000 | Christie et al. | |
| 6,032,118 A | 2/2000 | Tello et al. | |
| 6,035,405 A | 3/2000 | Gage et al. | |
| 6,041,056 A | 3/2000 | Bigham et al. | |
| 6,041,109 A | 3/2000 | Cardy et al. | |
| 6,073,160 A | 6/2000 | Grantham et al. | |
| 6,081,518 A | 6/2000 | Bowman-Amuah | |
| 6,094,437 A | 7/2000 | Loehndorf | |
| 6,097,720 A | 8/2000 | Araujo et al. | |
| 6,097,722 A | 8/2000 | Graham et al. | |
| 6,118,785 A | 9/2000 | Araujo et al. | |
| 6,137,793 A | 10/2000 | Gorman et al. | |
| 6,141,339 A | 10/2000 | Kaplan et al. | |
| 6,148,074 A | 11/2000 | Miloslavsky et al. | |
| 6,167,432 A | 12/2000 | Jiang | |
| 6,169,735 B1 | 1/2001 | Allen, Jr. et al. | |
| 6,181,693 B1 | 1/2001 | Maresca | |
| 6,219,348 B1 | 4/2001 | Allen, Jr. et al. | |
| 6,222,842 B1 | 4/2001 | Sasyan et al. | |
| 6,229,810 B1 | 5/2001 | Gerszberg et al. | |
| 6,252,857 B1 | 6/2001 | Fendick et al. | |
| 6,285,676 B1 | 9/2001 | Kodama | |
| 6,289,001 B1 | 9/2001 | Smyk | |
| 6,292,495 B1 | 9/2001 | Von Hammerstein et al. | |
| 6,298,043 B1 | 10/2001 | Mayger et al. | |
| 6,345,048 B1 | 2/2002 | Allen, Jr. et al. | |
| 6,345,051 B1 | 2/2002 | Gupta et al. | |
| 6,366,577 B1 | 4/2002 | Donovan | |
| 6,366,948 B1 | 4/2002 | Teibel | |
| 6,373,930 B1 | 4/2002 | McConnell et al. | |
| 6,389,011 B2 | 5/2002 | Allen, Jr. et al. | |
| 6,400,716 B1 | 6/2002 | Munakata et al. | |
| 6,434,152 B1 * | 8/2002 | Yamamura | 370/395.2 |
| 6,434,612 B1 | 8/2002 | Hughes et al. | |
| 6,473,427 B1 | 10/2002 | Brodigan | |
| 6,473,430 B2 | 10/2002 | Sreedharan et al. | |
| 6,504,819 B2 * | 1/2003 | Fowler et al. | 370/230 |
| 6,529,479 B1 | 3/2003 | Suzuki | |
| 6,542,475 B1 | 4/2003 | Bala et al. | |
| 6,563,794 B1 * | 5/2003 | Takashima et al. | 370/236 |
| 6,563,835 B1 | 5/2003 | Chen | |
| 6,587,467 B1 | 7/2003 | Morgenstern et al. | |
| 6,597,689 B1 | 7/2003 | Chiu et al. | |
| 6,618,381 B1 | 9/2003 | Miyamoto et al. | |
| 6,621,793 B2 | 9/2003 | Widegren et al. | |
| 6,633,569 B2 | 10/2003 | Hemmady | |
| 6,636,516 B1 | 10/2003 | Yamano | |
| 6,741,585 B1 | 5/2004 | Munoz | |
| 6,801,508 B1 | 10/2004 | Lim | |
| 6,804,247 B1 | 10/2004 | Sasyan et al. | |
| 6,807,174 B2 | 10/2004 | Bernstein et al. | |
| 6,822,962 B1 | 11/2004 | Noake et al. | |
| 6,842,449 B2 | 1/2005 | Hardjono | |
| 6,859,457 B1 | 2/2005 | Tanaka | |
| 6,870,841 B1 | 3/2005 | Brown et al. | |
| 6,928,167 B1 | 8/2005 | Meda et al. | |
| 6,937,595 B2 | 8/2005 | Barzegar et al. | |
| 6,937,598 B1 | 8/2005 | Hagirahim et al. | |
| 7,088,677 B1 * | 8/2006 | Burst, Jr. | 370/229 |
| 7,167,446 B2 * | 1/2007 | Itoh | 370/230 |
| 2001/0026553 A1 | 10/2001 | Gallant et al. | |
| 2002/0010866 A1 | 1/2002 | McCullough et al. | |
| 2002/0024954 A1 | 2/2002 | Cunetto | |
| 2002/0071427 A1 | 6/2002 | Cunetto | |
| 2002/0071472 A1 | 6/2002 | Dickson | |
| 2002/0089985 A1 * | 7/2002 | Wahl et al. | 370/395.1 |
| 2002/0126674 A1 | 9/2002 | Hemmady et al. | |
| 2002/0143959 A1 | 10/2002 | El-Base et al. | |
| 2002/0150110 A1 | 10/2002 | Inbar et al. | |
| 2002/0156914 A1 | 10/2002 | Lo et al. | |
| 2003/0016676 A1 | 1/2003 | Cunetto | |
| 2003/0031184 A1 | 2/2003 | Cunetto | |
| 2003/0128698 A1 | 7/2003 | Darland et al. | |
| 2003/0133454 A1 | 7/2003 | Gallant et al. | |
| 2004/0107238 A1 | 6/2004 | Orton et al. | |

FOREIGN PATENT DOCUMENTS

| | | |
|---|---|---|
| WO | 98/26627 | 6/1998 |
| WO | 98/36612 | 8/1998 |
| WO | 98/37727 | 8/1998 |
| WO | 99/30530 | 6/1999 |
| WO | 00/62496 | 10/2000 |
| WO | 03/009528 | 1/2003 |

OTHER PUBLICATIONS

"Method for the Conversion of Multimedia Streams to Packet Streams", IBM Technical Disclosure Bulletin, pp. 95-98 (Jun. 1994).

Printout of a website entitled "Abstract-Security for Asynchronous transfer Mode (ATM) Networks", WPI Department of Electrical and Computer Engineering, (Apr. 1996).

English language Abstract of JP 8-186580 (Jul. 1996).

Riggs, "Telcos to Open ATM SVC Floodgate", pp. 1-3, downloaded from the internet at lantimes.com (Mar. 1997).

Reece et al., "The Broadband Call Control Demonstrator—A Platform for ITU-T, DAVIC and TINA-C Implementations", BT Technology Journal, vol. 16, No. 2, pp. 155-168 (Apr. 1998).

Newman et al., "Ipsilon's General Switch Management Protocol Specification: The Internet Society, 1998", version 2, The Internet Society, Network Working group, pp. 1-79 (1998).

Shou et al., "Efficient Location Management for Hybrid Wireless ATM Networks; Architecture and Performance Analysis," IEEE, pp. 378-381 (1999).

Yager, "White Paper: Cisco Asymmetric Digital Subscriber Line Services Architecture", Cisco Systems, (Jul. 2000).

Marshall et al., "SIP Extensions for Media Authorization ", pp. 1-25, <draft-ietf-sip-call-auth-00.txt>, (Nov. 2000).

Marshall et al., "SIP Extensions for Media Authorization", pp. 1-23, <draft-ietf-sip-call-auth-01.txt> (Feb. 2001).

Clark et al., The Personal Router Whitepaper', MIT Laboratory for Computer Science, Version 2.0, downloaded from the internet at ana.lcs.mit.edu/anaweb/PDF/PR_whitepaper_v2.pdf, (Mar. 2001).

Clark et al., "Bandwidth-on-Demand Networks—A Solution to Peer-to-Peer File Sharing", BT Technology Journal, vol. 20, No. 1, pp. 53-63 (Jan. 2002).

Loeser et al., "Distributed Video on Demand Services on Peer to Peer Basis", 1st International Workshop on Real-Time LANs in the Internet Age, pp. 1-4, downloaded from the internet at hurray.isep.ipp.pt/rtlia2002/full_papers/20_rtlia.pdf, (Jun. 2002).

Taylor et al., "Do you Need Frame Frame-to-ATM SVC", pp. 1-2, downloaded from the internet at nwfusion.com., (Jun. 2002).

Bauer et al., "The Personal Router", The Eighth ACM International Conference on Mobile Computing and Networking, p. 1 (Sep. 2002).

cnfport: Configure Port—PXMIE, Cisco MGX 8830, MGX 8850 (PXM45 and PXMIE), and MGX 8950 Command Reference, Release 3, Part No. 78-14789-01 Rev. B0, p. 2-299 (Jan. 2003).

"dspport: Display Port—PXMIE", Cisco MGX 8830, MGX 8850 (PXM45 and PXMIE), and MGX 8950 Command Reference, Release 3, Part No. 78-14789-01 Rev. B0, p. 2-749 (Jan. 2003).

"Voice Over ATM Switched Virtual Circuits on the Cisco MC3810", pp. 1-5, downloaded from the internet at cisco.com.

* cited by examiner

| Virtual UNI VPCI | VPI/VCI Range | | Control Channel VPI/VCI |
|---|---|---|---|
| | VPI | VCI | |
| 1 | 1 | 32-36 | 1/32 |
| 2 | | 37-41 | 1/37 |
| ... | | ... | ... |
| n+1 | | (32+5*n)–(36+5*n) | |
| ... | | ... | ... |
| 198 | | 1022-1026 | 1/1022 |
| 199 | 2 | 32-36 | 2/32 |
| 200 | | 37-41 | 2/37 |
| ... | | ... | ... |
| 396 | | 1022-1026 | 2/1022 |
| ..... | | | |
| 2971 | 16 | 32-36 | 16/32 |
| 2972 | | 37-41 | 16/37 |
| ... | | | |
| 3168 | | 1022-1026 | 16/1022 |

EXTENDED VIRTUAL USER-TO-NETWORK INTERFACE WITH ATM NETWORK

This application is a continuation of pending U.S. patent application Ser. No. 10/369,505, filed Feb. 21, 2003, the disclosure of which is expressly incorporated by reference herein in its entirety.

This application is related to U.S. patent application Ser. No. 10/286,786, filed Nov. 4, 2002, entitled "Peer to Peer SVC-Based DSL Service," in the names of Wenge CHEN et al., the disclosure of which is expressly incorporated by reference herein in its entirety.

BACKGROUND OF THE INVENTION

1. Field of the Invention

The present invention relates to the field of communications. More particularly, the present invention relates to dynamically establishing broadband quality of service (QoS) connections, on demand, between peers on a network to guarantee application specific IP QoS via the combination of ATM switched virtual connections (SVCs) and permanent virtual connection (PVCs). Alternative processes are disclosed, including (i) dynamically establishing an SVC shortcut connection from a peer device using an SVC signaling proxy device without going through an ISP, and (ii) creating multiple virtual user-to-network interfaces (UNIs) within a single virtual path (VP) at each port of an ATM edge switch to establish SVCs between subscribers.

2. Background Information

Network carriers are currently providing broadband access services to a large number of subscribers using asynchronous transfer mode (ATM) and digital subscriber lines (DSL). Under the current paradigm, subscribers connect to an Internet service provider (ISP) using a pre-existing static point-to-point or "nailed up" connection, e.g., a PVC. Once the connection has been established the subscriber can communicate to the ISP, via the connection, using various bridge or router modes. In the case of bridge mode, typically point-to-point protocol (PPP) or point-to-point protocol over Ethernet (PPPoE) is used to set up the user sessions and carry the user IP packets to the ISP. When a subscriber wishes to communicate with a peer subscriber, all communications via IP packets travel through the ISP, thus suffering implementation complexity and operational unfeasibility for supporting application specific QoS.

Furthermore, subscribers currently interface with the ATM network over PVCs via standard UNIs. To support on-demand, SVC-based connections, each customer must be able to dynamically signal connection establishment requests to the ATM network. If both ATU-R and ATM switch support SVC, but the DSLAM does not, the current virtual UNI-based implementations suffer from scalability limitations. For example, using a single UNI supports only a single customer because one signaling channel exists for the entire UNI. Using virtual UNIs expands the limit to 256 customers because virtual UN's sub-divide the UNI into a maximum of 256 virtual UNIs, each having a unique Virtual Path Identifier (VPI). However, a single virtual UNI, which supports ATM network access of a single subscriber, requires an entire VP, even though most of the virtual channels (VCs) within the VP are not needed to support the SVC. A limited number of VPs are available at each port of an ATM edge switch and/or a digital subscriber line access multiplexer (DSLAM) connected to the ATM edge switch, which accordingly restricts the number of UNIs that may be supported by the network at any one time. For example, a DS3 or a OC3 port typically accommodates at most 256 VPIs, thereby limiting each port to support of 256 virtual UNIs, even though a DSLAM may service thousands of subscribers.

It is desirable to have a system that enables each VP to support multiple UNIs, expanding the ATM network's capability to support guaranteed QoS connections, without having to increase the number of physical ports of various network elements.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 4 is a table showing an exemplary VPI/VCI arrangement for Extended Virtual UNI, according to an aspect of the present invention;

DETAILED DESCRIPTION OF EMBODIMENTS

Figure 1:
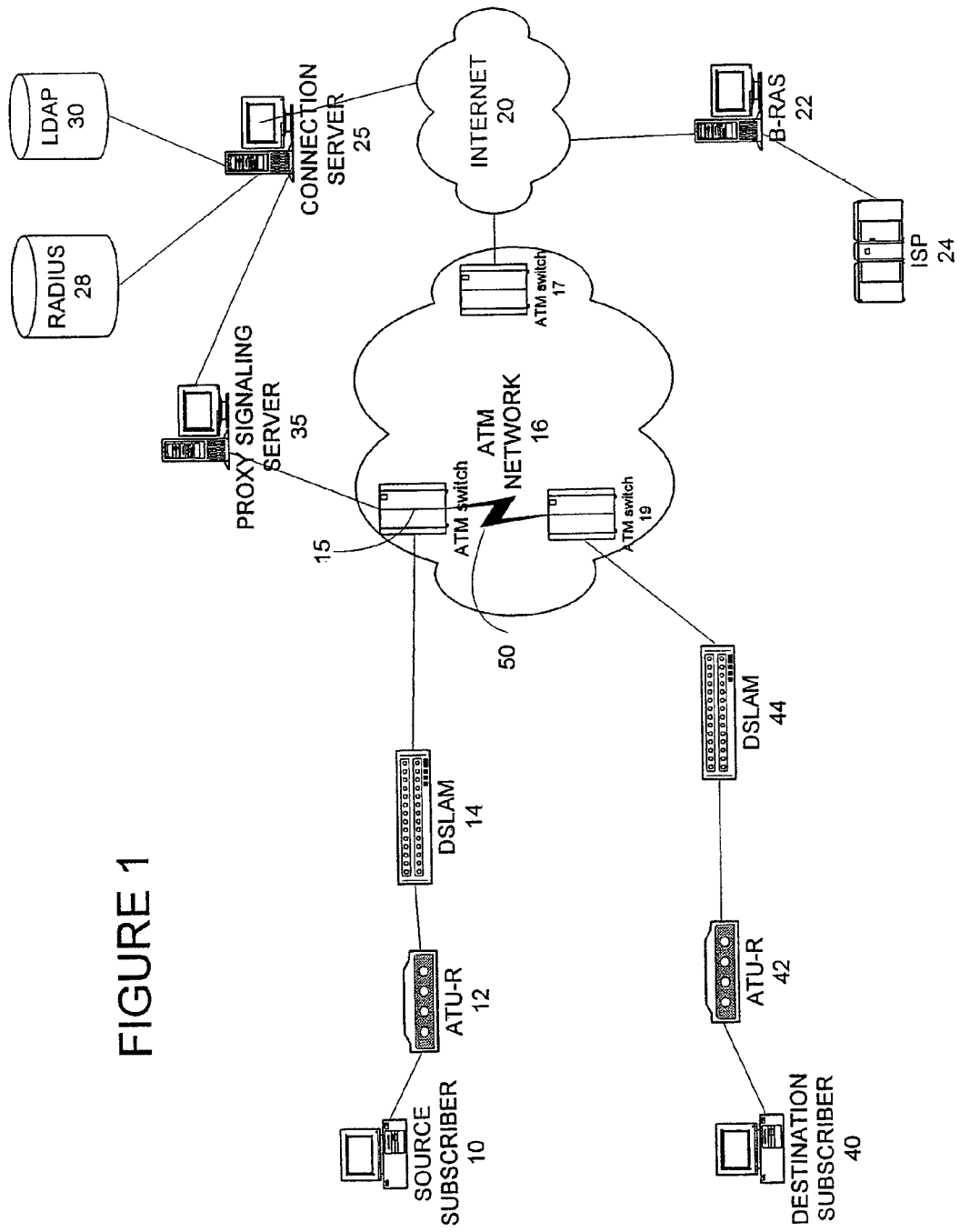
FIG. 1 is a block diagram showing an exemplary network architecture for proxy signaling, according to an aspect of the present invention.

The present invention relates to establishing broadband QoS connections between peers on an ATM network to guarantee application specific IP QoS, through SVCs and PVCs. When an ATU-R does not have SVC capability, an SVC may be dynamically established by a proxy signaling alternative, discussed below. When the peer device has SVC capability, an SVC may be efficiently established through one of many UNIs set up within a single VP at each port of an ATM edge switch, referred to as Extended Virtual UNI.

In view of the above, the present invention, relating to Extended Virtual UNI, through one or more of its various aspects and/or embodiments is presented to accomplish one or more objectives and advantages, such as those noted below.

An aspect of the present invention provides a method for establishing at least one SVC through an ATM switch port, which includes multiple VPs, by associating multiple virtual UN's to each of the VPs. Each VP includes multiple VC ranges, each of which corresponds to a different virtual UNI. Also, each VC range includes at least one VC for control and at least one VC for data transfer. Associating the virtual UNIs to each of the VPs of the ATM switch port may include mapping each virtual UNI to a corresponding VC range within a VP based on a VPI/VCI of the virtual UNI initially received by the ATM switch port.

Another aspect of the present invention provides a method for supporting multiple virtual UNIs within a single VP, which includes multiple VCs. The method includes assigning a virtual UNI to the VP, and assigning at least one control VC and at least one data VC of the VP to the virtual UNI, such that the at least one data VC is contiguous with the at least one control VC. Multiple virtual UNIs are thus available for the VP. A QoS may be associated with an application of the virtual UNI. At least one of the control and data VCs are then assigned based on the QoS.

A minimum number of contiguous data VCs needed to support the QoS may be determined. The determined number of data VCs is assigned to the virtual UNI. Likewise, a minimum number of contiguous control VCs needed to support the QoS may be determined. The determined number of control VCs is assigned to the virtual UNI. One of the at least one control VCs is a signaling channel. The minimum number of data VCs or control VCs may be as few as one VC.

Another aspect of the present invention provides a method for establishing an SVC in an ATM network by receiving a signaling message, via a virtual UNI, to set up the SVC, and assigning the virtual UNI to a range of VCs within a single VP based on a VPI/VCI of the signaling message. The VP includes at least one additional range of VCs assigned to another virtual UNI. The SVC is then established using the range of VCs assigned to the virtual UNI.

Another aspect of the present invention provides a system for establishing at least one SVC in an ATM network, including an ATM network element having multiple ports, each of which supports multiple VPs. The ATM network element may include an ATM edge switch or a DSLAM. The ATM network element associates multiple virtual UNIs to each of the VPs. Each VP includes multiple VC ranges, each of which corresponds to a different virtual UNI of the multiple virtual UNIs. Each VC range includes at least one VC for control, including signaling, and at least one VC for data transfer. The ATM network element may associate the virtual UN's to each VP by mapping each virtual UNI to a corresponding VC range within the VP, based on a VPI/VCI of the virtual UNI initially received at a corresponding port.

Yet another aspect of the present invention provides a computer readable medium for storing a computer program that establishes at least one SVC by way of an ATM switch port, which includes multiple VPs. The computer readable medium includes an associating source code segment that associates multiple virtual UNIs to each of the VPs. Each VP includes multiple VC ranges, each of which corresponds to a different virtual UNI of the multiple virtual UNIs. Also, each VC range includes at least one VC for control and at least one VC for data transfer.

The computer readable medium may further include a mapping source code segment that maps each virtual UNI to a corresponding VC range within a VP based on a VPI/VCI of the virtual UNI initially received by the ATM switch port. The associating source code segment associates the multiple virtual UNIs to each of the VPs based on the mapping. The computer readable medium may also include a determining source code segment that determines a size of each VC range based on an application of the corresponding virtual UNI.

The various aspects and embodiments of the present invention are described in detail below.

1. Proxy Signaling

FIG. 1 is a block diagram depicting an exemplary network infrastructure in which the present invention operates, as it relates to proxy signaling. A source subscriber's computer 10 is connected to a DSL ATU-R 12 at the subscriber's premises. Although the subscriber's computer is referred to as a PC in the following description, the computer is not limited to a personal computer. Rather the subscriber's computer (also referred to as a client) can be any device capable of communicating to an ISP.

An exemplary DSL ATU-R is the SpeedStream 5360 DSL Model, available from Efficient Networks, Inc. of Dallas Tex. The DSL ATU-R 12 connects to a DSLAM 14 using a pre-existing digital subscriber line. The DSLAM 14 is connected to a high speed network, e.g., an ATM network 16. The DSLAM 14 connects to an ATM edge switch 15, which operates as a gateway into the ATM network 16. Although the following description refers only to ATM, any connection-oriented network that supports equivalent QoS can be substituted for the ATM network 16.

The ATM network 16 includes a number of ATM switches 15, 17, 19. Exemplary switches include the Alcatel 7670 Routing Switch Platform, available from Compagnie Financière Alcatel of Paris, France. An exemplary DSLAM 14 is the Alcatel 7300 Advanced Services Access Manager, available from Compagnie Financière Alcatel of Paris, France.

An edge ATM switch 17 of the ATM network 16 connects via the Internet 20 to a service provider's broadband remote access server (B-RAS) 22. The B-RAS 22 terminates PPP connections for each DSL subscriber 10. An exemplary B-RAS 22 is an SMS 1800, available from Redback Networks Inc. of San Jose, Calif. The B-RAS 22 connects to the Internet service provider 24. The connection to the Internet service provider (ISP) 24 is via a local connection, such as an Ethernet connection.

Typically the connection from the subscriber 10 to the B-RAS 22 is pre-provisioned and it will be referred to as a signaling connection or a control connection. In one embodiment, the control connection is a manually configured PVC though which a PPP session is established.

According to an aspect of the present invention, the subscriber 10 can dynamically select a peer device, such as the destination subscriber device 40, to communicate with and can request QoS connections to the peer device by communicating over the control connection. In one embodiment, the QoS connection to the peer device 40 is a dynamically established SVC 50. Although the description refers to an SVC as the QoS connection, it is noted that an SVC is merely a non-limiting example of a QoS connection; and another type of QoS connection, such as Soft Permanent Virtual Circuit (SPVC), can be used instead of an SVC without departing from the scope and spirit of the present invention. An example of when a subscriber 10 might desire such a QoS connection is when the subscriber 10 desires to engage in a video conference with another subscriber 40.

In order to dynamically establish the SVC 50, the subscriber 10 transmits a connection setup request to the connection server 25. In the following description, subscriber refers to the combination of the client and an associated network service agent. The client communicates to the connection server 25 via an API to a software component, the network service agent, which is located on the client (bridge model) or ATU-R (routed model). The request, originating from the subscriber 10 is transmitted to the connection server 25 over the subscriber's best effort connection to the ISP 24. The request includes information about the SVC 50 (or SVCs, each being associated with a different application) to be setup, including the destination subscriber 40, a shared session key agreed upon by subscriber 10 and subscriber 40, a class of service of the SVC 50, and a traffic descriptor of the SVC 50. The class of service can be, for example, constant bit rate (CBR) or variable bit rate (VBR). The traffic descriptor describes the requested bandwidth in terms of ATM standard traffic descriptors, e.g., by sustained cell rate (SCR), peak cell rate (PCR), and maximum burst size (MBS).

The connection server 25 then queries an LDAP 30 for information about the subscriber 10 and the subscriber 40.

The LDAP 30 receives such subscriber information, and information about the network as part of the provisioning process flow. Exemplary subscriber and network information includes the following information for both subscriber 10/switch 15 and subscriber 40/switch 19: the switch identifier of the switch 1 (possibly an IP address or switch specific proprietary address); the physical port number and the logical port number; end system addresses, e.g., ATM end system address (AESA), of source and destination UNIs; a set of VPI/VCIs at the source UNI and a set of VPI/VCIs at the destination UNI; and an address (e.g., an IP address) of a proxy signaling agent (PSA) 35. The LDAP 30 also stores some other network related information, such as up-link port speeds and DSL synchronization rates needed for the connection server to calculate total available bandwidths and perform the CAC function for ATU-R and DSLAM ports.

Authorization and authentication information can also be retrieved from a RADIUS server 28, if necessary. In addition, accounting records can be stored on the RADIUS server 28. The RADIUS server 28 is provisioned with the user authentication information (username and password) as part of the customer management flow.

In one embodiment, the destination subscriber 40 must also perform the previously described actions by requesting a connection to the source subscriber 10 with identical parameters after the subscriber 40 receives the application session setup message from subscribe 10 through the best effort connection. By receiving connection requests from both subscribers 10, 40 within a time-out period, the connection server 25 considers the connection request to be both originated and accepted by both subscribers 10, 40.

After the necessary information, such as the AESAs, VPI/VCIs, class of service, and bandwidth, etc., is obtained from the LDAP 30 and the RADIUS server 28, the connection server 25 performs a call admission control (CAC) step to determine if sufficient available bandwidth exists in the ATU-Rs and DSLAMs to accommodate the connection request. The connection server 25 maintains state information of the currently available bandwidth at each subscriber's ATU-R and related DSLAM up-links. If sufficient bandwidth is available, then the connection server 25 sends the SVC request and the necessary information to a proxy signaling agent 35. The proxy signaling agent 35 is responsible for performing the SVC signaling and relaying results and status information from the network elements to the connection server 25. That is, the proxy signaling server 35 communicates with the SVC capable ATM network 16 to establish, to tear down, and to obtain the status of SVC connections, and to obtain information about resource availability.

After receiving the necessary information, the proxy signaling agent 35 communicates with the requesting subscriber's edge switch 15 to initiate an SVC 50 to the destination subscriber's edge switch 19. The proxy signaling agent 35 informs the edge switch 15 of the destination switch address and then the SVC 50 is set up in the standard manner.

Once the SVC 50 is set up, the proxy signaling agent 35 informs the connection server 25, then the connection server 25 sends a message to both subscribers, specifically the network service agent associated with each client, informing them of the successful connection establishment. Then the routing tables are updated in both subscribers' PCs (for bridge mode) or ATU-Rs (for router mode) so that QoS application packets can be sent over the new QoS connection. In the bridge mode, a packet mapping table is also modified in the ATU-R. As is well known, every PC has a routing table to provide the routing information when multiple IP interfaces are available for outbound IP traffic. Routing entries in the routing table typically follow the syntax of <destination IP network address, network mask, gateway IP address, interface IP address, metric>. The operating system routing function will forward a packet according to the longest matched routing entries in the routing table based on the destination address in the packet.

According to the present invention, the location of the routing tables varies. In a bridge mode, the routing table is stored on the source subscriber's computer 10. In a routing mode, the routing tables are stored on the subscriber's ATU-R 12.

Regardless of where the routing table is stored, traffic packets are transmitted from the source subscriber 10 over either the new QoS connection or the default route to the ISP, based upon whether or not the packet originates from an application associated with the new QoS connection. For example, if the application requesting the SVC 50 is a video conferencing application and the packets being transmitted originate from the video conferencing application, then the video conferencing packets are transmitted over SVC 50. In other words, the packets travel from the subscriber 10, through the PVC from ATU-R 12 to the DSLAM 14, the SVC 50 from the ATM switch 15 to the ATM switch 19, and the PVC from the DSLAM 44 to the ATU-R 44 and finally to the destination subscriber 40. If the packet originates from other applications than the QoS application, the packets are transmitted, as usual, via the default route (or routes) to the ISP 24 and then on to its intended destinations.

Routing packets based upon the originating application will be referred to as policy based routing or filtering. Policy based routing ensures QoS for specific end user applications. According to an aspect of the present invention, the policy based routing capability is dynamic. That is, the policy based routing only occurs during a session, e.g., during a video call. When the session terminates, the ATU-R 12 receives a signal indicating the session termination and the pattern matching and filtering cease. Accordingly, all traffic is routed over the normal channel.

Policy based routing thus occurs when an SVC 50 has been set up. For router mode, after the setup, the PC 10 sends a header pattern to the ATU-R 12 so that the ATU-R 12 knows to filter traffic matching the received pattern. In other words, the ATU-R 12 knows to send the traffic matching the header pattern to the new QoS connection. When a packet does not match the header pattern, the packet is sent along its normal route.

Current routing tables have routing entries associated with a destination network address. The current entries are typically too coarse to distinguish between the specific applications for the purpose of mapping into a specific route. According to the present invention, a new gateway (i.e., the QoS connection/the SVC) exists to handle special traffic (e.g., video conference traffic). Policy routing is a function to filter the video conference traffic and direct such traffic to a separate gateway different from that default gateway define in the existing routing table.

In one embodiment, the syntax of the policy routing instruction is: <source IP network address, source network mask, destination IP network address, destination network mask, IP protocol ID, type of service (TOS), source port number, destination port number, gateway IP address, interface IP address, metric>. The IP protocol ID parameter defines the layer 4 protocol. The type of service parameter refers to a field in the IP header to carry information on traffic packet priority, e.g., best effort, highest priority, etc. The gateway IP address refers to the next hop. The interface IP address refers to the egress port. The metric defines an administrator assigned weight, the weight being assigned to different routes, e.g., hop count.

An example will now be provided. Assume the routing policy is as follows: 64.2.12.3 255.255.255.0 217.34.67.122 255.255.255.255 17 8 6000 6000 66.2.12.1 64.2.12.3 1. Then, all packets having the value matching this specific policy will be directed to gateway 66.2.12.1 via 64.2.12.3, which is a local interface IP address.

Figure 3:
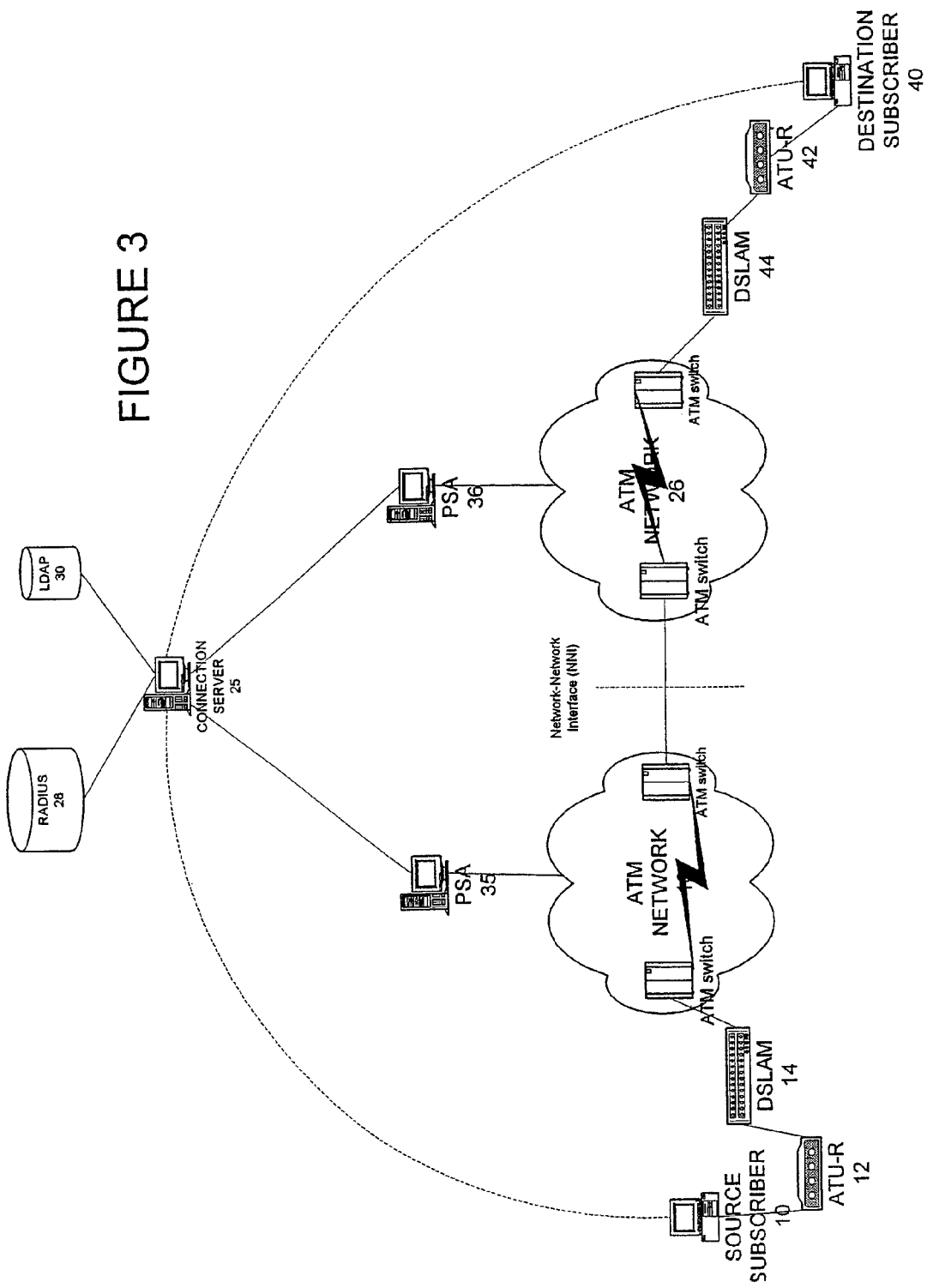
FIG. 3 is a block diagram showing an exemplary network architecture for proxy signaling, according to another embodiment of the present invention.

Referring to FIG. 3, another embodiment is described in which multiple proxy signaling servers 35, 36 are provided. In this embodiment, the source subscriber 10 and the destination subscriber 40 may be assigned to different proxy signaling agents 35, 36 at the LDAP 30. In such a case, the setup process is slightly different. If both subscribers 10, 40 are located within the same ATM domain, the connection must choose which side to originate the SVC connection and to contact the originator's proxy signaling agent 35 to set up the connection. If the subscribers 10, 40 are located in different ATM domains (as shown in FIG. 3), e.g., different vendor domains owned by a single carrier, the connection server 25 establishes two connection segments, one originating at each subscriber, to a common network to network interface (NNI) meeting point. The connection server 25 can retrieve available NNI information from the LDAP 30 to handle these types of connections. The connection server 25 can also track real time state information about NNI usage.

As discussed above, a router mode and a bridge mode are available. In the router mode, the ATU-R 12 functions like a traditional router. That is, the ATU-R 12 examines the layer 3 and layer 4 information and routes packets based upon such information. Accordingly, the ATU-R 12 routes at the application level. In this embodiment, the routing table resides at the ATU-R 12. Moreover, it is well known that in the router mode the PPPoE session from subscriber to ISP originates on the ATU-R 12.

In the bridge mode, the ATU-R 12 functions like an Ethernet bridge with additional packet mapping capabilities. Ethernet bridges without additional mapping capabilities have no IP awareness and can only perform switching at a host level of granularity. The switching is based on MAC addresses, which are unique per client. In this embodiment, the routing table resides at the client 10 and the client 10 performs the routing. In addition, a packet mapping filter at the ATU-R switches the packets into different outgoing PVCs based on mapping rules associated with each QoS session. These rules consider layer three and layer four header information in a manner similar to the described policy routing method.

In the bridge model, a client DSL dialer application establishes a standard, best effort PPPoE session between the client PC 10 and the ISP B-RAS 22. The ISP 24 provides the client 10 with a public IP address, which is globally reachable. In the router mode, the ISP 24 assigns the ATU-R 12 a global IP address and the ATU-R 12 performs NAT for private addresses that it, in turn, assigns to the client 10.

In the bridge mode, policy routing occurs in the PC and a mapping occurs in the ATU-R. That is, the PC decides whether to send traffic over the PPP session or directly to the ATU-R over Ethernet. The packet received at the ATU-R, however, requires an additional mapping step. Once the traffic is received at the ATU-R, the ATU-R determines which PVC to send the traffic over. One PVC is assigned to the PPP session, and other PVCs can match different SVCs in the ATM network. The additional mapping step is enabled by a mapping table in the ATU-R that shows which PVCs are currently attached to SVCs. Although all packet travels through the ATU-R, some packets are encapsulated in a PPP session, whereas other packets are raw IP packets transported via the Ethernet connection.

Regardless of whether the bridge mode or the routed mode is in use, header patterns are always sent to the ATU-R. The header patterns that are sent are the same header patterns that the PC uses to determine whether to encapsulate the packet. That is, the PC decides whether to use PPP or not, and the ATU-R decides which PVC to use. Once an SVC is set up, both tables are updated.

In the router mode, all policy routing occurs in the ATU-R, therefore only one table exists. Accordingly, no dynamic changes occur in the PC and packets are not encapsulated in PPP by the PC. When appropriate, the ATU-R encapsulates the packets in PPP.

The connection server 25 terminates customer control channel sessions, which transit the public IP network. The control channel session is used by the customers to send CONNECT and DISCONNECT requests to the connection server 25. The connection server 25, in return, reports connection status information to the customers using the control channel session. In an embodiment of the present invention, this control channel session employs authentication and encryption.

The connection server 25 maintains two levels of sessions: (1) a per user session anchored on the control channel connection; and (2) a per SVC session anchored on individual SVC connections set up by the service. When a user logs in, the user establishes a user session that is associated with the user ID. Once the user establishes an SVC, an SVC session is created. If the user establishes another SVC, another SVC session is created. Thus, each user session may be associated with multiple SVC sessions.

The connection server 25 performs the CAC function for the user ATU-R and DSLAM ports and is able to manage the complex topology of any DSLAM 14. This is necessary because the pre-provisioned PVCs in the ATU-R 12 and DSLAM 14 will require over subscription of the priority bandwidth on the DSLAM up-link ports. Over subscription occurs when a group of PVCs, with aggregate bandwidth exceeding the actual available bandwidth, are created. It is assumed that, statistically, only a fraction of the PVCs are active simultaneously and that the bandwidth used by the active fraction does not exceed the actual available bandwidth. It is advantageous to service providers to over subscribe network resources to take advantage of this statistical multiplexing effect. For example, a DSLAM up-link may have enough bandwidth to handle ten simultaneous QoS connections. The service provider may choose to provision twenty QoS PVCs on that up-link if it is expected that typically only ten or fewer of the QoS PVCs are in use at one time. In this scenario, the connection server CAC function would prevent the eleventh QoS PVC from becoming active should the actual usage exceed the expected usage. Only as many pre-provisioned QoS PVCs may be active as there is bandwidth available thus ensuring the QoS of the active connections.

The connection server 25 can be any server class system, such as a UNIX workstation. The connection server 25 tracks the PVCs' status in real time, monitoring whether the PVCs are in use or available. If multiple applications share a PVC, the connections server 25 monitors how much available bandwidth is allocated to each application. When enough bandwidth is not available for a connection request, the connection server 25 denies service requests. The connection server 25 handles association of PVCs and SVCs, and also reserves space on PVCs.

In one embodiment, each DSLAM actually includes a master DSLAM and at least one slave DSLAM. In this embodiment, the connections server 25 is aware of the DSLAM topology, e.g., the total bandwidth available on a DSLAM trunk port. The topology information is useful so that the connection server 25 is aware of which PVCs are used to connect from the trunk port of the master DSLAM to the appropriate subscriber port. The connections server 25 ensures that enough bandwidth exists for a connection request, and if so, grants the bandwidth to the user.

Figure 2:
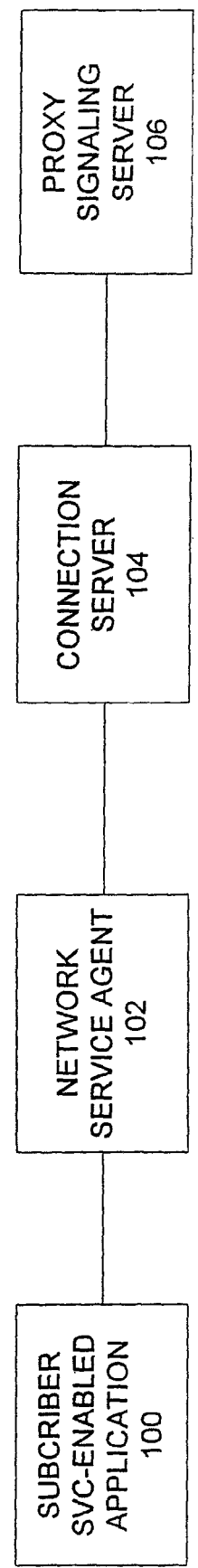
FIG. 2 is a block diagram illustrating an exemplary relationship between logical components of proxy signaling, according to an aspect of the present invention.

A logical view of the system is now described with reference to FIG. 2. A subscriber SVC-enabled application 100, running on the client PC, negotiates with a peer to establish agreed upon parameters for a direct SVC connection. This negotiation occurs using the best effort PPPoE channel, i.e., the control channel. Both SVC-enabled end points must agree upon a required class of service, a required bandwidth or bit rate, and a shared secret or session key that uniquely identifies the proposed session between these two end points. The mechanism of this negotiation is independent of the SVC service. For example, the negotiation could be an Instant Messaging server facilitated negotiation or a voice telephone call between users.

The subscriber SVC-enabled application 100 at each endpoint sends a request to establish a SVC connection to its respective network service agent 102, which resides in the subscriber's computer 10 or the ATU-R 12. The request includes the source username, destination username, class of service, bandwidth, shared session key, and IP routing/mapping information.

The network service agent 102 can be located on either the client PC 10 or the ATU-R 12. In the bridge mode, the network service agent 102 resides on the subscriber's system 10 and in the router mode it resides on the subscriber's ATU-R 12. The network service agent 102 handles network layer connection duties, including managing an API interface between the ATU-R 12 and the subscriber 10. The network service agent 102 also manages the routing tables as well as session establishment and termination. In addition, the network service agent 102 executes packet filtering rules.

In one embodiment, the network service agent 102 includes two input APIs: (1) an HTTP or command line API, e.g., a Telnet based configuration suitable for direct human interaction, and (2) a socket based API for process to process communications. Users or applications, which are clients of the network service agent 102, can send CONNECT, DISCONNECT, STATUS, and REACHABILITY requests to the connection server 104 via the network service agent 102 and the secure connection between the network service agent 102 and the connection server 104. Return information from client requests should be explicitly output to the user in the case of the human readable interface. For the process to process API, return information can be returned via the socket connection between the client process 100 and network service agent 102. In addition, the client process 100 should be able to poll status information via the network service agent 102 to self determine the result of requests.

Because the network service agent 102 changes the routing and mapping tables, the layer 3 and layer 4 information associated with the SVC flow must be communicated by the application or user to the network service agent 102 as part of the CONNECT request. Only the information relevant to layer 2 provisioning is passed on to the connection server 104 for the SVC portion of the connection establishment.

Output APIs are also provided in the network service agent 102. In the bridge mode, the network service agent 102 (residing in the client 10) manipulates the static policy routing tables in the client 10 and the mapping filter function in the ATU-R 12. In the router mode, the network service agent 102 (residing in the ATU-R 12) manipulates the policy routing tables and mapping filter function of the ATU-R 12. As noted above, in the router mode the client 10 uses the ATU-R 12 as the default layer 3 gateway and does not require additional configuration.

The network service agent 102 is responsible for establishing a secure connection to the connection server 104, providing authentication information to the connection server 104, and authenticating the identity of the connection server 104. The network service agent 102 is also responsible for handling client requests by working with the connection server 104, over the network service agent 102/connection server 104 secure channel, to establish and tear down SVC connections and to poll current status information. In response to SVC status changes resulting from configuration requests or network events, the network service agent 102 re-configures routing and mapping tables in the client 10 and/or ATU-R 12 to maintain appropriate routing of client traffic.

Each network service agent (local and remote) 102 will, on-demand, establish a secure channel to the connection server 104 over the best effort PPPoE channel. The network service agent 102 also authenticates each user to determine whether the user is authorized to establish SVCs. Once authenticated, the connection server 104 authenticates the management session and responds to connection setup requests, connection tear down requests, connection status polls, and reachability inquiries.

In one embodiment, to service a connection setup request, the connection server 104 receives matching connection requests from both network service agents 102 within a time-out window. The connection requests should have matching attribute elements. To service a connection tear down request, the connection server 102 can receive a request from only one of the network service agents 102. The connection server 104 may respond to connection status polls with status messages indicating the SVCs in use, class of service, bandwidth, session keys, etc. Optionally, the connection server 104 may also send asynchronous status updates to the network service agents 102 upon connection and/or disconnection.

In the event of connection setup or tear down, the connection server 104 communicates with the proxy signaling agent 106 to accomplish the requested provisioning task. The proxy signaling agent 106 signals the network elements to provision the SVC. Upon confirmation of successful provisioning, the SVC status is passed back to the connection server 104 and to the network service agent 102.

After receiving verification of SVC setup, each network service agent 102 changes policy routing tables in the PC 10 or ATU-R 12, in bridge and routing modes, respectively; changes mapping functions in the ATU-R 12; and informs the requesting subscriber SVC-enabled application 100 that the SVC channel has been configured. The mapping functions in the ATU-R 12 include the rules that the ATU-R 12 should use for filtering each packet and directing the packet into a specific PVC that connects to the SVC. As discussed above, the mapping function is dynamically established to correspond to the SVC session duration.

Informing the application 100 that the SVC channel has been configured may be accomplished in a session established between the subscriber SVC-enabled application 100 and the network service agent 102. Alternatively, the subscriber SVC-enabled application 100 may simply poll the network service agent 102 for connection status to self determine success or failure.

Once the SVC has been established and appropriate routing changes have been made, packets matching the policy routing and/or mapping rules will be transmitted over the SVC channel as long as the SVC is active.

The SVC may be deactivated by either: (1) the subscriber SVC-enabled application 100 sending a disconnect request to the connection server 104 via its network service agent 102, (2) termination of the connection server 104 to network service agent 102 management channel (either explicit or time-out), or (3) a network event such as re-routing or other failure. When a network event occurs, the SVC status is known by the proxy signaling agent 106 and communicated to the connection server 104. Moreover, the connection server 104 informs both sides that the SVC has been cleared. In the event of a disconnect request or termination of the management channel, the connection server 104 informs the non-disconnected side that the SVC has been cleared.

Upon notification of SVC tear down via either an update message or status polling, the network service agent 102 modifies the policy routing and mapping tables in the client device 10 and/or ATU-R 12 to reflect the change in connectivity.

Communications between the network service agent 102 and the connection server 104 are now discussed in more detail.

A CONNECT request should include the following parameters: source subscriber, destination subscriber, class of service, bandwidth, and session key. In order to process the CONNECT request, matching CONNECT requests should be received from both the source subscriber and the destination subscriber within a time-out period. The connection server 104 processes validated CONNECT requests by querying the LDAP 30 to determine required provisioning information, such as AESAs, available PVC identifiers at each end-point, etc. The connection server 104 also selects suitable PVC identifiers, class of service, and traffic descriptors, and performs CAC functions for ATU-R and DSLAM ports based on real time SVC tracking information and port speeds obtained from the LDAP 30. Finally, the connection server 104 services validated CONNECT requests by passing provisioning information to the proxy signaling agent 106.

Upon being notified by the proxy signaling agent 106 of successful provisioning or failure to provision, the connection server 104 updates its internal real time SVC session tracking information. The provisioning result may be communicated to the calling network service agents 102 by an explicit response to the CONNECT request and/or waiting for the network service agent 102 to inquire about the current SVC status information (polling).

A DISCONNECT request should include the following parameters: source subscriber, destination subscriber, class of service, bandwidth, and session key. A DISCONNECT request is determined to be valid when it is received from one or both network service agents 102 and it matches an existing, previously established SVC connection. The connection server 104 services valid DISCONNECT requests by matching the DISCONNECT request with its real time SVC tracking table, and communicating stored information to the proxy signaling agent 106 to clear the SVC.

Upon provisioning success or failure, communicated by the proxy signaling agent 106, the connection server 104 updates its internal real time SVC session tracking information. The provisioning result may be communicated to the calling network service agent 102 by an explicit response to the DISCONNECT request and/or waiting for the network service agent 102 to inquire about the current SVC status information (polling).

A STATUS request requires no parameters. The connection server 104 simply updates the requesting network service agent 102 with the status of all SVCs terminated by the ATU-R 12 managed by the network service agent 102.

A REACHABILITY request requires a destination subscriber parameter. In response to a REACHABILITY request, the connection server 104 informs the querying network service agent 102 of whether the destination subscriber is reachable, via SVC, from the source subscriber 10. The response to the request only confirms that source to destination connectivity is possible, and it does not take into account available bandwidth, etc.

Each network service agent 102 connects to the connection server 104 to initiate SVC connections. This network service agent 102 to connection server 104 connection is made over the public Internet, and it must be authenticated and secure.

If the network service agent 102 to connection server 104 connection is dropped or times out, any SVCs established by the network service agent's username is automatically released by the connection server 104. In the case of multiple network service agent 102 to connection server 104 connections using the same username (PC client based network service agent 102), all SVCs established under the username must be released automatically once the final network service agent 102 to connection server 104 connection is dropped or times out. Time outs may be determined using an explicit keep-alive mechanism if this is not provided by the secure encryption layer.

2. Extended Virtual UNI

An advantage of the proxy signaling approach, described above, is that such an approach does not require SVC capability for ATU-Rs or for DSLAMs. If the ATU-R does have SVC capability, and DSLAM does not support SVC, another approach may be employed. Such an approach will be referred to as Extended Virtual UNI.

Extended Virtual UNI enables an SVC to be set up between an originating ATU-R and a destination ATU-R, through the ATM network, using an established range of VCs within a single VP. Conventionally, initiating an SVC from an ATU-R to an ATM edge switch using Virtual UNI (e.g., ATM Forum UNI 4.0) presents a scalability problem when the deployed DSLAM is not SVC capable. Each Virtual UNI requires the use of one VP, a limited number of which are available at each port of the DSLAM and at the ATM switch. Therefore, use of Virtual UNI to enable SVCs between the ATU-R and the ATM switch is unacceptably restrictive and impractical.

According to the present invention, each VP (identified by a corresponding VPI) is segmented into a number of VC ranges, consisting of multiple, contiguous VCs (identified by corresponding VCI address ranges). Each of the VC ranges accommodates a Virtual UNI, greatly increasing the capacity of each VP to support multiple Virtual UN's. A VC range includes at least one VC dedicated to control and at least one VC dedicated to data. The control VCs include a signaling channel, which enables setting up and tearing down the SVCs. The control VC and the signaling channel may be one in the same. However, when there are multiple contiguous control VCs, only one VC need be dedicated to signaling. The remaining control VCs may support additional control information, such as interim local management interface (ILMI) data, for example. The VC range and the associated VP appear in the header of every ATM cell that is sent to the destination once the SVC has been established.

FIG. 4 is a table indicating an exemplary VPI/VCI arrangement for Extended Virtual UNI, in which sixteen VPs are segmented to support over 3000 Virtual UNIs by segmenting each VP into multiple sets of five contiguous VCs, indicated by the corresponding VCIs. Although FIG. 4 shows an embodiment in which the number of VCs for each VP for each Virtual UNI is set at five, it is understood that the number of VCs may be any subset of contiguous VCs within the corresponding VP, without departing from the scope and spirit of the present invention.

The first column of FIG. 4 indicates the virtual path connection index (VPCI) that identifies the Virtual UNI corresponding to the range of VCs within a particular VP. As indicated, there are sixteen VPs, which is the typical number of VPs corresponding to a port of an ATM edge switch, although alternative numbers of VPs for each port may be used without departing from the scope and spirit of the present invention. Each VP is segmented into 198 VCI ranges, corresponding to 198 Virtual UNIs. Therefore, according to the depicted embodiment, a total of 3168 Virtual UNIs are accommodated through one port of the ATM edge switch.

The second column of FIG. 4 identifies the VPI/VCI range in each of the sixteen VPs. As stated above, each VCI address range has been predetermined to include five VCs in the present example. Accordingly, VPCI number 1 is established through VCIs 32 to 36 of VPI number 1, and VPCI number 396 is established through VCIs 1022 to 1026 of VPI number 2. (The first Virtual UNI is shown to begin at VCI 32 because VCIs 0-31 within each VPI are typically reserved for signaling data.) The relationship between the range of VCIs and the number of the Virtual UNI is indicated generally in the row corresponding to VPCI n+1. In particular, the VCI range for VPCI n+1 extends from 32+(5*n) to 36+(5*n).

The third column of FIG. 4 identifies the control channel for each VPCI. The control channel carries the signaling that enables connection setup, identification of network elements and clients, and the like. As discussed above, at least one control channel in a VC range must be dedicated to transmitting signaling relating to the network, although additional control channels may accommodate addition types of control data. In the exemplary embodiment of FIG. 4, each VC range includes one control channel (e.g., assigned to the first VC of each VC range). For example, the control channel of VPCI number 1 is VCI 32 within VPI 1 (i.e., 1/32), and the control channel of VPCI number 3168 is VCI 1022 within VPI 16.

Figure 6:
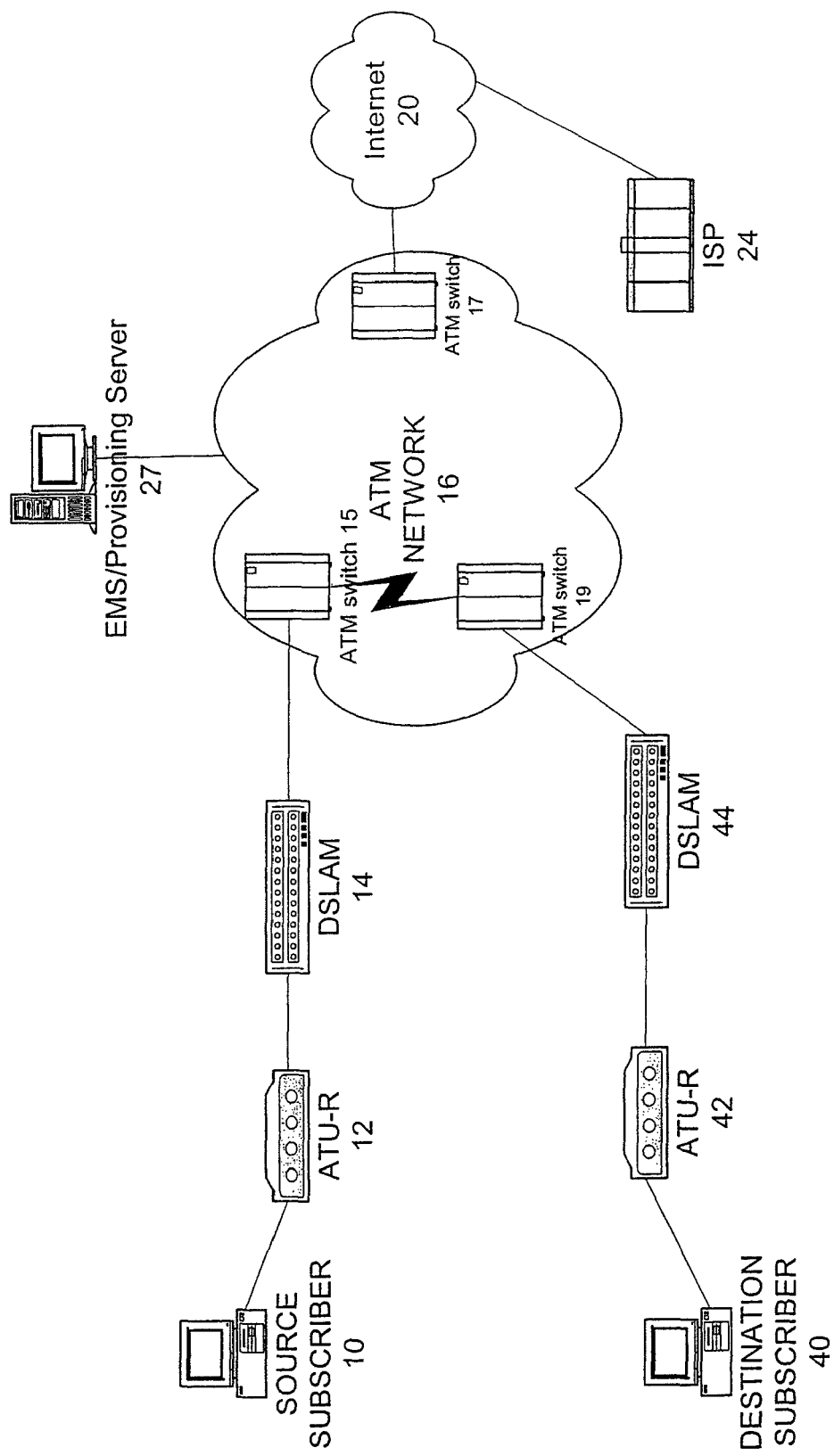
FIG. 6 is a block diagram showing an exemplary network architecture for Extended Virtual UNI, according to an aspect of the present invention.

Extended Virtual UNI is implemented in a packet based communications network, such as the ATM network depicted in FIG. 6. FIG. 6 depicts various network elements generally similar to those described above with respect to FIG. 1, to the extent the reference numerals correspond. Implementation of Extended Virtual UNI requires software enhancements to various network elements, including the ATU-R 12, the DSLAM 14 and the ATM switch 15. In an embodiment of the invention, the enhanced ATU-R 12 supports ATM Forum UNI 3.1, UNI 4.0 and ILMI. An API to a network service agent, such as the network service agent 102 of FIG. 2, is included to enable SVC initiation. The ATU-R 12 also includes decode/encode capability up to layer 4 (e.g., TCP/UDP) for the routed mode. The enhanced ATU-R 12 also requires policy-based routing, enabling packets to be forwarded on different VCs (e.g., based on L1-L4 information), and VC based queuing, scheduling and shaping, enabling forwarded traffic to conform to the SVC parameters.

In the exemplary embodiment, the DSLAM 14 is pre-configured with cross-connect PVCs, which map the signaling channel's VPI/VCI address and the data channels' VPI/VCI addresses in the UNI of the ATU-R 12 to Extended Virtual UNI addresses in the ATM switch 15. For example, the cross-connect PVCs in the DSLAM 14 may be pre-configured to map ATU-R 12 UNI addresses to Extended Virtual UNI addresses as follows: The UNI signaling channel is mapped from VPI/VCI 0/5 to VPI/VCI 3/60; the CBR channel is mapped from VPI/VCI 0/32 to VPI/VCI 3/61; the VBR-rt is mapped from VPI/VCI 0/40 to VPI/VCI 3/62; and the VBR-nrt is mapped from VPI/VCI 0/48 to VPI/VCI 3/63. Consistent with the invention, the VPI/VCIs of the Extended Virtual UNI indicate contiguous VCs within the same VP.

The ATM switch 15 is configured to support Extended Virtual UNI. Also, additional levels of CAC are required for traffic management of the DSLAM trunk port congestion point and customer service control, including Logical Port (UNI) Level CAC, Extended Virtual UNI Level CAC, and per connection level CAC. The connection level CAC enables the SVC call request to be matched to a pre-provisioned PVC in the DSLAM 14. Furthermore, the ATM switch 15 stores the following information in relation to each Extended Virtual UNI: a service-active identifier, which is set upon subscription to the service; a VPI/VCI range, identifying the VP and the range of contiguous VCs within the VP; a maximum equivalent bandwidth and an available bandwidth; and information regarding the PVCs pre-configured in the DSLAM 14. The PVC information includes, for example, the VPI/VCI of the Extended Virtual UNI, the VPI/VCI of the ATU-R 12 UNI, the service category (e.g., CBR, VBR-rt, VBR-nrt, UBR), traffic descriptors (e.g., PCR, SCR, MBS), QoS parameters (cell loss rate, latency, jitter), and the status of the connection (e.g., busy, free).

In an embodiment of the invention, an element management system (EMS)/provisioning server 27 servicing the ATM network 16 is also included. The EMS/provisioning server 27 supports SVC call based billing functions, such as usage based accounting. The EMS/provisioning server 27 is also enhanced to support configuration of Extended Virtual UNI in the edge switches, such as the ATM switches 15 and 19.

Figure 5:
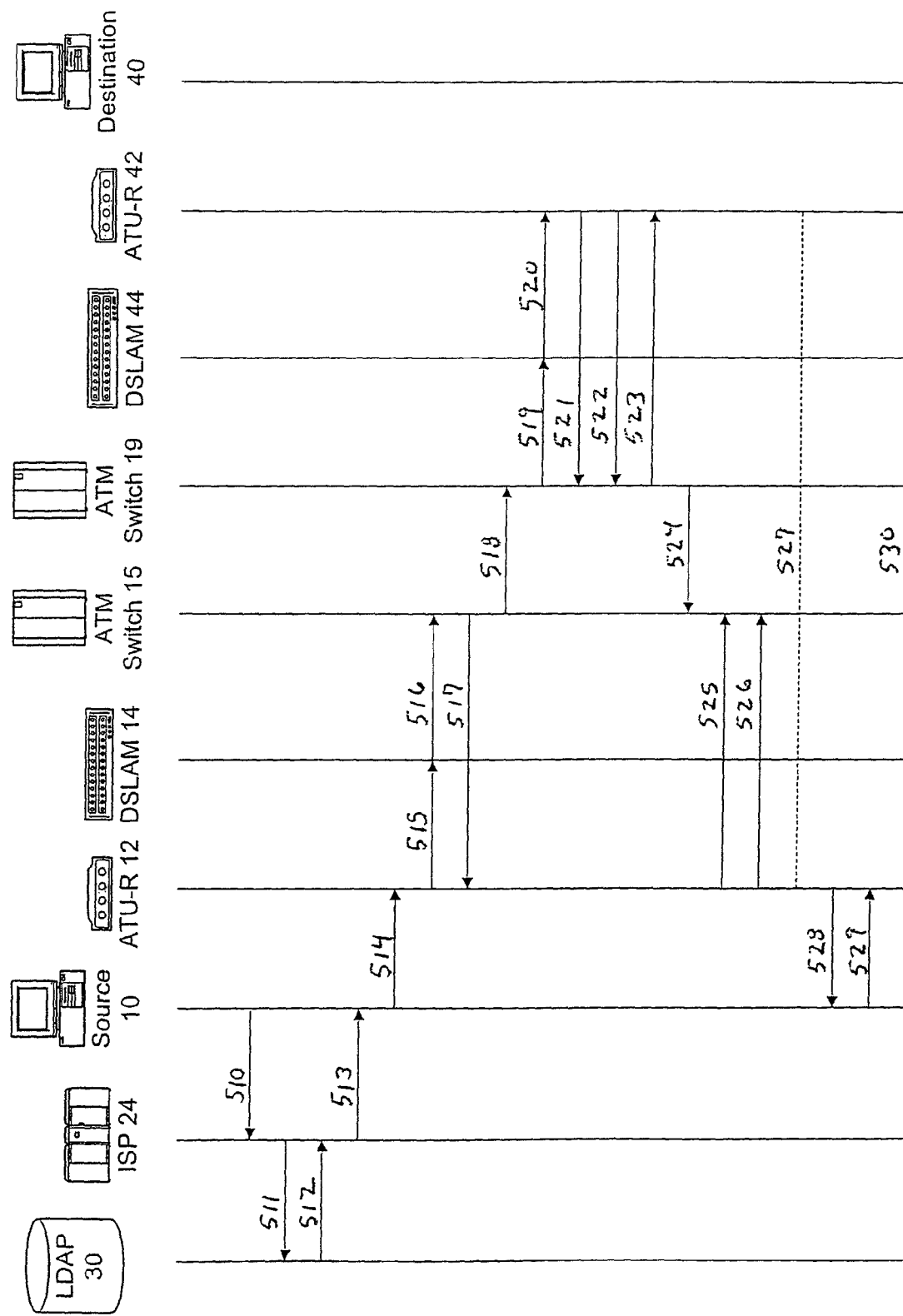
FIG. 5 is an exemplary call flow diagram showing an SVC being set up using Extended Virtual UNI, according to an aspect of the present invention.

FIG. 5 is an exemplary call flow diagram showing an SVC established through the ATM network 16, using Extended Virtual UNI, between the source subscriber 10 and the destination subscriber 40. The request to setup the SVC is initiated by the source subscriber 10. In the depicted embodiment of the invention, the source subscriber 10 initially contacts the ISP 24 via the Internet 20 (not pictured in FIG. 5) at step 510. The source subscriber 10 identifies the destination subscriber 40, for example, by providing an associated IP address to the ISP 24. At step 511, the subscriber 10 queries a database through the ISP 24, such as the LDAP 30, to retrieve the AESA of the ATU-R 42, corresponding to the destination subscriber 40, based on the IP address provided by the source subscriber 10 at step 510. The LDAP 30 performs a lookup of the AESA and replies with the AESA of the ATU-R 42 at step 512, which is forwarded to the source subscriber 10 at step 513.

In alternative embodiments, the source subscriber 10 identifies the AESA of the ATU-R 42 in any appropriate manner, without departing form the scope and spirit of the present invention. For example, the source subscriber 10 may maintain a pre-established database of AESAs for commonly connected destinations. Alternatively, the AESA may be retrieved from an instant messaging server.

Once the source subscriber 10 has retrieved the AESA, it initiates a connection with the ATM network 16 by sending a signaling message, such as a setup connection request, to the ATU-R 12 at step 514. In an embodiment of the invention, the QoS application sends a QoS connection setup message through the API to the ATU-R. The setup message carries the service category, the traffic descriptors and the QoS parameter, described above. In an alternative embodiment, the QoS application sends the QoS connection setup message through the API to a network service agent (not pictured in FIG. 5), such as the network service agent 102 of FIG. 2. The network service agent translates the connection setup message and forwards it to an SVC signaling entity in the ATU-R 12. The signaling message also includes the AESA of the destination subscriber 40, as well as the QoS requirement for supporting the underlying application.

Upon receipt of the connection setup request, the ATU-R 12 sends a standard SVC SETUP message over a standard UNI signaling channel, transparently through the DSLAM 14, to the Extended Virtual UNI of the ATM switch 15 at steps 515 and 516. The standard UNI signaling channel is cross-connected by DSLAM 14 to the first channel (or first set of contiguous control channels) of the Extended Virtual UNI in the ATM switch 15. The first channel is, by default, the signaling channel of the Extended Virtual UNI. The SETUP message likewise includes the AESA of the destination subscriber 40 and the QoS requirement. For example, when a SETUP message is received on a VC having a VPI/VCI of 1/37, the UNI is mapped to the Extended Virtual UNI corresponding to VPCI number 2 (VPI 1/VCIs 37-41).

When the ATM switch 15 receives the SETUP message, it initially determines whether the requested connection is authorized and the requested service is available. The ATM switch 15 then performs various CAC functions, discussed above. For example, the ATM switch 15 performs a standard ATM UNI CAC and an Extended Virtual UNI CAC to determine whether there is enough available or equivalent bandwidth to accommodate the new connection. If not, the ATM switch 15 sends a reject message back to ATU-R 12, indicating the reason for failure as not enough network resources.

The ATM switch 15 also performs a connection CAC to determine whether any of the pre-configured PVCs in the DSLAM 14 for this subscriber can satisfy the requirement of the connection based on traffic descriptors and QoS requirements. If not, it sends a reject message back to ATU-R 12 with the reason for failure as not enough network resources. If the pre-configured PVCs can satisfy the requirement, the ATM switch 15 selects a PVC with the lowest service category and lowest bandwidth from all of the PVCs that satisfy the requirement and extracts the necessary data associated with the selected PVC, including VPI/VCI in the Virtual Extended UNI, corresponding VPI/VCI in ATU-R UNI.

The ATM switch 15 then initiates a standard SVC connection setup procedure. For example, the ATM switch responds to the ATU-R 12 with a CALL-PROCEED message at step 517 to indicate initiation of the requested connection at the QoS requirement. The message informs the ATU-R 12 which VPI/VCI should be used for this connection.

At step 518, the ATM switch 15 sends the SETUP message to the terminating edge switch, ATM switch 19, through the ATM network 16 (not pictured in FIG. 5). The message may be routed directly to the ATM switch 19, or may pass through any number of intervening switches, depending on the layout of the ATM network 16. All transit (i.e., non-terminating) ATM switches treat the call as a standard SVC call.

When the ATM switch 19 receives the SETUP message, it performs the same CACs as the ATM switch 15, described above, to check whether there are enough network resources to accommodate this connection. When any of the CAC checks fail, a standard release message is returned to the ATM switch 15. When all of the CAC checks are passed, the ATM switch 19 selects a PVC with the lowest service category and lowest bandwidth from the PVCs that satisfy the requirement, in the manner discussed above. The ATM switch 19 extracts the necessary data associated with the PVC, including VPI/VCI in the Virtual Extended UNI, corresponding VPI/VCI in the UNI of the ATU-R 42.

The ATM switch 19 sends the SETUP message to the ATU-R 42, via the DSLAM 44, at steps 519 and 520, specifying the VPI/VCI in the SETUP message that ATU-R 42 UNI should use for the connection. The ATU-R 42 sends a CALL-PROCEED message to the ATM switch 19 at step 521 (via the DSLAM 44) to indicate initiation of the requested connection. At step 522, the ATU-R 42 sends a CONNECT message (via the DSLAM 44), indicating that it has accepted the call. The ATM switch 19 returns a CONNECT-ACKNOWLEDGE message to the ATU-R 42 at step 523 (via the DSLAM 44) and sends a CONNECT message to the ATM switch 15 at step 524 through the ATM network 16. The ATM switch 15 likewise sends a CONNECT message to the ATU-R 12 at step 525 (via the DSLAM 14), utilizing the established Extended Virtual UNI. For example, when the Virtual UNI is VPCI number 2 (indicated by FIG. 4), the CONNECT message passes to the ATU-R 12 via the VC identified by VPI/VCI 1/37. A CONNECT-ACKNOWLEDGE message is returned to the ATM switch 15 at step 526 (via the DSLAM 14). The resulting SVC connection is indicated by the dashed line at step 527.

The ATU-R 12 acknowledges to the source subscriber 10 that the SVC has been set up at step 528. In an embodiment of the invention, once the connection is built successfully, each of the ATU-R 12 and the ATU-R 42 informs its respective network service agent (not pictured in FIG. 5) to add a specific policy routing entry into its routing table (e.g., in the corresponding PC for the bridge mode and in the ATU-R for the routed mode). The calling end network service agent informs the corresponding application that the QoS connection is ready for use.

When the application proceeds, the source subscriber 10 sends a request to use the SVC to the ATU-R 12 at step 529. The request includes, for example, the IP address and port address of the destination subscriber 40, the protocol ID and the QoS. The connection between the source subscriber 10 and the destination source 40, including the SVC, is indicated by step 530. The signaling and data passed over the SVC is mapped to the VPI/VCIs of the Extended Virtual UNI as established during the connection setup.

According to an exemplary call release procedure for the peer to peer QoS service with Extended Virtual UNI, just before the QoS application is closed, the application sends a message through network service agent to the ATU-R 12 to release the QoS connection. The ATU-R 12 sends a standard release message to the ATM switch 15 and deletes the corresponding policy routing entry in the routing table. The ATM switch 15 performs standard SVC release actions and, at the same time, releases the occupied PVC. The ATM switch 15 accordingly adds the equivalent bandwidth of the connection back to the available bandwidth of the Extended Virtual UNI and the available bandwidth of the DSLAM trunk port.

When the ATU-R 42 receives the release message, it likewise deletes the corresponding policy routing entry in the routing table, and responds with a standard UNI signaling message (e.g., a RELEASE COMPLETE message) to the ATM switch 19. When the ATM switch 19 receives the RELEASE COMPLETE message, it performs the same actions as the ATM switch 15, releasing the utilized resources.

The provisioning, control and billing of the Extended Virtual UNI service may be implemented by known methods. In an embodiment of the present invention, the ATM edge switches are the service provisioning and control points.

Therefore, customers, who signal SVC connection requests without ordering peer to peer QoS services, receive no response to the UNI signaling since a service active identifier is not initially set in the corresponding ATM switch. Also, service related data is configured through the EMS/provisioning server 27, discussed above, into the corresponding ATM edge switch. Extended Virtual UNI based CAC functions limit the actual allocated equivalent bandwidth, to avoid exceeding the maximum equivalent bandwidth for the Extended Virtual UNI. Policing may be imposed on each connection based on the traffic descriptors. Billing likewise may be based on traffic descriptors, as well as service categories, duration and traffic usage.

Using Extended Virtual UNI, the ATM switch 15 is able to support the SVC between the ATU-R 10 and the ARU-R 42 without having to dedicate an entire VP to that single SVC. The ATM switch is able to meet the QoS requirements and still support additional Virtual UNIs through the same VP, more efficiently utilizing the VCs within one VP. Thus, according to the present invention multiple subscribers can connect to the ATM network 16 and set up SVCs using respective Virtual UNIs, corresponding to distinct ranges of contiguous VCs within a single VP. Consequently, additional SVCs are enabled through the network, guaranteeing QoS for specific end user applications, without having to expand the physical port capacity of various network elements.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. For example, although the description has been directed towards setting up a QoS connection to a peer subscriber, the connection(s) could also be set up to one or more application service providers (ASPs).

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium, e.g., a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for signaling and packet-switched network transmission and public telephone networks (e.g., ATM and DSL) represent examples of the state of the art. Such standards are periodically superseded by faster or more efficient equivalents having essentially the same functions. Accordingly, replacement standards and protocols having the same functions are considered equivalents.

What is claimed is:

1. A method of dynamically establishing communication between a source and a destination, comprising:
   receiving a connection request based on a request transmitted over a best-effort path from the source; and
   establishing a network connection having a specified quality of service (QoS) based on the request between the source and the destination,
   wherein data for a first application is transmitted over the network connection and data for a second application is transmitted over the best-effort path, and
   wherein application-level routing of the data for the first application occurs via a separate gateway different from a default gateway used to route the data for the second application.

2. The method according to claim 1,
   wherein the first application requires the specified quality of service.

3. The method according to claim 2,
   wherein the second application does not require the specified quality of service.

4. The method according to claim 1,
   wherein the network connection comprises a switched virtual circuit (SVC).

5. The method according to claim 1,
   wherein the network connection comprises a soft permanent virtual circuit (SPVC).

6. A system implemented on at least one processor for dynamically establishing communication between a source and a destination, comprising:
   a receiver that receives a connection request based on a request transmitted over a best-effort path from the source; and
   a processor that establishes a network connection having a specified quality of service (QoS) based on the request between the source and the destination,
   wherein data for a first application is transmitted over the network connection and data for a second application is transmitted over the best-effort path, and
   wherein application-level routing of the data for the first application occurs via a separate gateway different from a default gateway used to route the data for the second application.

7. The system according to claim 6,
   wherein the request is received by a connection server via an application programming interface (API).

8. The system according to claim 6,
   wherein the first application comprises a video conference.

9. The system according to claim 6,
   wherein the request comprises at least one of a destination address, a shared session key, a class of service and a traffic descriptor.

10. The system according to claim 9,
wherein the class of service comprises one of constant bit rate (CBR) and variable bit rate (VBR).

11. The system according to claim 9,
wherein the traffic descriptor comprises requested bandwidth information.

12. The system according to claim 9,
wherein the traffic descriptor comprises one of sustained cell rate (SCR), peak cell rate (PCR) and maximum burst size (MBS).

13. A non-transitory, tangible computer readable medium comprising a set of instructions for dynamically establishing communication between a source and a destination, the set of instructions directing at least one processor to perform acts of:
   receiving a connection request based on a request transmitted over a best-effort path from the source; and
   establishing a network connection having a specified quality of service (QoS) based on the request between the source and the destination,
   wherein data for a first application is transmitted over the network connection and data for a second application is transmitted over the best-effort path, and
   wherein application-level routing of the data for the first application occurs via a separate gateway different from a default gateway used to route the data for the second application.

14. The non-transitory, tangible computer readable medium according to claim 13,
   wherein the application-level routing of the data for the first application occurs during a session for the first application.

15. The non-transitory, tangible computer readable medium according to claim 14,
   wherein the application-level routing terminates when the session terminates.

16. The non-transitory, tangible computer readable medium according to claim 13,
   wherein the network connection is established based on source information obtained for the source and destination information obtained for the destination.

17. The non-transitory, tangible computer readable medium according to claim 16,
   wherein the source information comprises at least one of link port speeds and digital subscriber line (DSL) synchronization rates, and
   wherein destination information comprises at least one of link port speeds and digital subscriber line synchronization rates.

18. The non-transitory, tangible computer readable medium according to claim 13,
   wherein the receiving further includes receiving a second connection request from the destination.

19. The non-transitory, tangible computer readable medium according to claim 18,
   wherein receiving the second connection request within a predetermined timeout period indicates acceptance of the connection request by the destination.

* * * * *